United States Patent Office 2,866,762
Patented Dec. 30, 1958

2,866,762

PROCESS FOR PREPARING POLYURETHANE FOAMS EMPLOYING TERTIARY AMINE CATALYSTS

Franzkarl Brochhagen, Odenthal Bezirk Koln, and Karl E. Müller, Leverkusen-Bayerwerk, Germany, assignors to Farbenfabriken Bayer Aktiengesellschaft, Leverkusen, Germany, a corporation of Germany No Drawing. Application August 9, 1954
Serial No. 448,746

Claims priority, application Germany August 19, 1953

1 Claim. (Cl. 260—2.5)

The present invention relates to foamed products based on polyurethanes and to a process for producing the same.

It is known to produce foamed products based on polyurethanes from polyesters and diisocyanates in the presence of activators.

When activators based on tertiary amines are used, the elastic foamed products thus produced exhibit a certain characteristic odour. Besides, the stability of the conventional activator mixtures is unsatisfactory, which renders it necessary for the activator mixture to be carefully supervised when the production is carried out continuously, the stability of said mixture being at most 4 hours.

An object of the present invention is to provide improved and odourless foamed products based on polyurethanes.

Another object is to provide a new process for the production of improved and odourless foamed products from polyesters and diisocyanates in the presence of activators.

A still further object is to provide new and stable activators mixtures for the manufacture of improved and odourless foamed products based on polyurethanes.

These and further objects are attained in accordance with the present invention by reacting a polyester and a diisocyanate in the presence of a tertiary amine containing at least one group able to react with isocyanates. Tertiary amines containing reactive groups able to react with isocyanates activate the foaming process and react at the same time with isocyanate groups, thus making it possible to produce odourless products. Because of the miscibility of the new activators with water the activator mixtures are stabilized.

Representative examples of groups reacting with isocyanates are amino, hydroxyl, carboxyl and mercapto groups. Suitable tertiary amines containing such reactive groups include, inter alia, methyl diethanolamine, N-diethyl ethanolamine, N-diethyl aminoacetic acid, methyl iminodipropionic acid and N-methyl dipropylene triamine.

The invention is further illustrated by the following examples without being restricted thereto, the parts being by weight.

Example 1

100 parts of a polyester obtained from 1 mol of adipic acid and 1.2 mols of diethylene glycol are mixed with 3 parts of methyl diethanolamine and 2 parts of water. Thereupon 35 parts of toluylene diisocyanate are added and the mixture is stirred.

After hardening an elastic, odourless, foamed product of a unit weight of 60 kg./m.$^3$ is obtained.

Example 2

100 parts of a polyester obtained from 2.5 mols of adipic acid, 0.5 mol of phthalic acid and 4 mols of hexanetriol are mixed with 2 parts of N-diethyl ethanolamine and 3 parts of sulfonated castor oil (water content: 50%). Thereupon 55 parts of toluylene diisocyanate are added.

After stirring a hard foamed product of a unit weight of 50 kg./m.$^3$ is obtained.

Example 3

100 parts of a polyester obtained from 1 mol of adipic acid, 1 mol of diglycol and 0.1 mol of trimethylol propane are mixed with 5 parts of methyl iminodipropionic acid and 3 parts of water. After adding 45 parts of toluylene diisocyanate the mixture is stirred.

An elastic foamed product of a unit weight of 40 kg./m.$^3$ is obtained.

Example 4

80 parts of a polyester obtained from 2.5 mols of adipic acid, 0.5 mol of phthalic acid and 4 mols of hexanetriol are mixed with 20 parts of a polyester obtained from 1.3 mol of adipic acid and 1 mol of hexanetriol, and 1.3 part of butylene glycol and 10 parts of siliceous chalk. After adding 1 part of N-methyl propylene diamine and 2 parts of sulfonated castor oil (water content: 50%) and mixing 55 parts of toluylene diisocyanate are added.

After intimately mixing a hard foamed product is obtained, which has a unit weight of 70 kg./m.$^3$ and is practically odourless.

What we claim is:

A process of producing a foamed plastic from (1) a hydroxyl polyester prepared by the esterification of a dicarboxylic acid with a polyhydric alcohol, (2) an organic diisocyanate, (3) an activator, and (4) water, which comprises adding said organic diisocyanate to a mixture comprising said hydroxyl polyester, water and the activator, said activator being a compound containing (a) at least one tertiary amino group, and (b) at least one group containing reactive hydrogen capable of reacting with an isocyanate and selected from the class consisting of amino, hydroxyl, and carboxyl groups; and thereafter stirring the resultant mixture, whereby a foamed plastic is formed.

References Cited in the file of this patent

UNITED STATES PATENTS

| | | |
|---|---|---|
| 2,597,025 | Orth | May 20, 1952 |
| 2,602,783 | Simon et al. | July 8, 1952 |
| 2,625,531 | Seeger | Jan. 13, 1953 |
| 2,625,535 | Mastin et al. | Jan. 13, 1953 |
| 2,650,212 | Windemuth | Aug. 25, 1953 |
| 2,683,727 | Mastin et al. | July 13, 1954 |
| 2,764,565 | Hoppe et al. | Sept. 25, 1956 |